(12) United States Patent
Greer (10) Patent No.: US 10,135,667 B1
(45) Date of Patent: Nov. 20, 2018

(54) SYSTEM AND METHOD FOR INCREASED INDOOR POSITION TRACKING ACCURACY

(76) Inventor: Kerry L. Greer, Melbourne Beach, FL (US)

( * ) Notice: Subject to any disclaimer, the term of this patent is extended or adjusted under 35 U.S.C. 154(b) by 161 days.

(21) Appl. No.: 13/492,411

(22) Filed: Jun. 8, 2012

Related U.S. Application Data (60) Provisional application No. 61/494,461, filed on Jun. 8, 2011.

(51) Int. Cl.
*H04W 24/00* (2009.01)
*H04L 29/08* (2006.01)
*H04W 4/029* (2018.01)
*H04W 64/00* (2009.01)

(52) U.S. Cl.
CPC ....... *H04L 29/08657* (2013.01); *H04W 4/029* (2018.02); *H04W 64/00* (2013.01)

(58) Field of Classification Search
CPC ........ G01S 5/10; G01S 13/878; G01S 13/003; G01S 7/4004; G01S 13/46; G01S 13/87; G01S 5/14; G01S 5/021; G01S 19/46; G01S 1/02; G01S 5/06; G01S 5/0221; G01S 5/04; G01S 5/02; G01S 19/41; G01S 19/07; G01S 19/43; G01S 5/009; G01S 19/15; G01S 5/0252; G01S 19/14; H04W 4/02; H04W 64/00; H04W 48/04; H04M 1/72572; H04M 1/72577; H04L 29/08657; H04L 29/08108; H04L 29/08936; G01C 21/20
USPC ... 455/404.2, 440, 448, 456.3, 456.6, 414.2, 455/430, 435.1, 566, 456.1–457; 370/328, 329, 331, 332, 400, 252; 342/126, 450–465
See application file for complete search history.

(56) References Cited

U.S. PATENT DOCUMENTS

| | | | | |
|---|---|---|---|---|
| 5,678,182 A * | 10/1997 | Miller | ................... | H04W 88/02 342/463 |
| 5,878,369 A * | 3/1999 | Rudow et al. | ................ | 701/470 |
| 6,054,950 A * | 4/2000 | Fontana | ........................ | 342/463 |
| 6,275,705 B1 * | 8/2001 | Drane | ..................... | G01S 1/024 342/357.31 |
| 6,433,740 B1 * | 8/2002 | Gilhousen | ..................... | 342/442 |
| 6,459,989 B1 * | 10/2002 | Kirkpatrick et al. | ......... | 701/470 |
| 6,560,207 B1 * | 5/2003 | Kimura | ................. | H04H 40/18 342/357.31 |
| 6,771,215 B2 * | 8/2004 | Akopian | ................. | G01S 19/24 342/357.63 |

(Continued)

*Primary Examiner* — Kathy Wang-Hurst
*Assistant Examiner* — B. M. M Hannan
(74) *Attorney, Agent, or Firm* — Malin Haley DiMaggio & Bowen, P.A.

(57) ABSTRACT

A method and system for increased position tracking resolution in a localized environment for use in GPS-denied areas such as within buildings or enclosed structures, comprising: multiple reference nodes each transmitting a synchronization pulse to a multitude of body-worn or device-mounted receiving units; a high speed clock circuit in each receiver capable of measuring the Time Difference of Arrival of said sync pulses to the resolution needed for precise positioning; a central processing computer used to calculate actual position of the receiving units relative to some fixed reference point; and a display system to monitor the position of the receiving units in real time as they move around within the target area overlaid onto available GIS data or building CAD drawings.

11 Claims, 3 Drawing Sheets

(56) References Cited

U.S. PATENT DOCUMENTS

| | | | |
|---|---|---|---|
| 6,856,806 B1* | 2/2005 | Bosik et al. ............... 455/445 |
| 7,167,717 B1* | 1/2007 | Goren ............... H04W 56/0015 |
| | | 370/324 |
| 7,203,497 B2* | 4/2007 | Belcea ............... 455/446 |
| 7,340,283 B1* | 3/2008 | Melick et al. ............ 455/562.1 |
| 7,636,061 B1* | 12/2009 | Thomas et al. ............ 342/464 |
| 2001/0004601 A1* | 6/2001 | Drane ............... G01S 1/024 |
| | | 455/456.1 |
| 2002/0006800 A1* | 1/2002 | Mohi ............... G01C 21/20 |
| | | 455/457 |
| 2002/0097182 A1* | 7/2002 | Goren ............... G01S 1/026 |
| | | 342/357.4 |
| 2003/0220092 A1* | 11/2003 | Hethuin ............... G01S 5/02 |
| | | 455/404.2 |
| 2005/0015198 A1* | 1/2005 | Kee ............... G01S 1/20 |
| | | 701/408 |
| 2006/0022871 A1* | 2/2006 | Zimmerman ........... G01S 19/11 |
| | | 342/464 |
| 2007/0060079 A1* | 3/2007 | Nakagawa ............ H04J 3/0682 |
| | | 455/131 |
| 2008/0090588 A1* | 4/2008 | Mizugaki ............ H04W 84/18 |
| | | 455/456.1 |
| 2009/0160699 A1* | 6/2009 | Gould ............... G01S 5/021 |
| | | 342/189 |
| 2009/0191897 A1* | 7/2009 | Johnson et al. ........... 455/456.3 |
| 2009/0322603 A1* | 12/2009 | Liao ............... 342/357.12 |
| 2010/0231435 A1* | 9/2010 | Zhen ............... G01S 13/765 |
| | | 342/47 |
| 2010/0272102 A1* | 10/2010 | Kobayashi ......... H04N 21/4305 |
| | | 370/389 |
| 2010/0311440 A1* | 12/2010 | Rakanovic et al. ....... 455/456.1 |
| 2012/0032855 A1* | 2/2012 | Reede ............... G01S 5/0289 |
| | | 342/458 |
| 2013/0281084 A1* | 10/2013 | Batada ............... H04W 4/008 |
| | | 455/426.1 |

* cited by examiner

SYSTEM AND METHOD FOR INCREASED INDOOR POSITION TRACKING ACCURACY

CROSS REFERENCE TO RELATED APPLICATIONS

This application expressly incorporates by reference and claims the benefit of the previously filed U.S. provisional application Ser. No. 61/494,461.

BACKGROUND OF THE INVENTION

Field of the Invention

This invention relates to systems and methods for position monitoring and display, and more specifically, to a system and method which enables real time position monitoring with DGPS level resolution in a GPS denied area.

Description of the Prior Art

It is a well know constraint to a typical Global Positioning System ("GPS") that the device whose location is being provided must have an unobstructed line of sight to four or more GPS satellites. The ability to accurately track or monitor the position of a person or an object not having such a line of sight is typically unable to be provided for by such a system. As such, for many years there has been a recognized need for system to provide real-time location monitoring of people or objects within a covered area, enclosed building, or wherever GPS coverage is not available. There have been a number of systems proposed using various technologies such as WiFi, ultrasound or cellular, but none have been shown to achieve both an indoor position accuracy equivalent to outdoor applications in use today such as Differential GPS ("DGPS") in addition to being operational over a large target area.

The Applicant's invention described herein provides a method and system capable of monitoring indoor positioning with sub-meter resolution within a target area of 1 km. Applicant's invention includes three distinct categories of components, a command node, a plurality of reference nodes, and one or more mobile nodes and it utilizes a very simple clock counting scheme, used to measure the relative difference in transmission times between reference nodes and a corresponding receiver in the mobile node(s) to obtain such accuracy over such a large area.

SUMMARY OF THE INVENTION

A system and method for increased position tracking resolution in a localized environment for use in GPS-denied areas such as within buildings or enclosed structures. The preferred embodiment of this system and method comprises three separate components: 1) one or more mobile nodes (or modules), 2) at least three sync pulse reference nodes (or modules), and 3) an overall system control command node (or module), which all operate together in a target area. Once the exact position of each reference node is established via DGPS and coordinated with command node, the reference nodes each begin broadcasting a synchronization (or sync) pulse simultaneously on a reoccurring period, driven off the 1 Pulse-Per-Second ("PPS") output from the DGPS.

The mobile nodes are registered with the command node prior to deployment into the target area through a WiFi data link and then sent into the target area. While in the target area, the mobile nodes receive the sync pulses from the reference nodes and records the exact time it receives the pulses from all three reference nodes, with the difference between the received times being the difference in radio frequency ("RF") propagation time between the closest and furthest reference node the exact time each sync pulse was received. The mobile nodes then measure the Time Difference of Arrival ("TDOA") between the multiple sync pulses to the resolution needed for precise positioning.

Once the TDOA for each active reference node's sync pulse is measured, it is sent by the mobile nodes while in the target area to the command node via the WiFi data link. The command node uses the TDOA measurements from a mobile node to calculate the actual position of the mobile node relative to the reference node. This exact position can then be provided to a display system to graphically display the position of the mobile units in real time as they move around within the target area. For increased utility or convenience, this graphical display can be overlaid onto available GIS data or building CAD drawings.

It is an object of this invention to provide a position tracking system and method with an accuracy equivalent to a DGPS system which can be used in an area without an unobstructed line of sight to GPS satellites and which does not require ultra precise oscillators.

It is another object of this invention to provide a position tracking system and method with <=1 meter x- and y-axis horizontal position resolution (where at least the standard 3 reference nodes are utilized) and <=5 meter z-axis vertical position resolution (when an optional 4th reference node is utilized).

It is yet another object of this invention to provide an indoor or covered area position tracking system which provides for >1 Hz position update/refresh rate.

It is still another object of this invention to provide an indoor or covered area position tracking system which can operate reliably within 1 km radius between reference nodes and the mobile nodes, including through the walls of commercial buildings in an RF multipath environment.

It is another object of this invention to provide an indoor or covered area position tracking system and method which is fast and easy to deploy in remote scenes of operation and which requires no new preexisting facilities or public infrastructure.

It is still another object of this invention to provide an indoor or covered area position tracking system and method which is easily scalable, able to monitor the real-time position of up to 50 mobile nodes.

And yet another object of this invention is to provide an indoor or covered area position tracking system and method with the ability to integrate with and overlay tracking data onto GIS maps of buildings or outdoor terrain in real-time, and accurately show the position of individual mobile nodes on such maps.

These and other objects will be apparent to one of skill in the art.

DETAILED DESCRIPTION OF THE INVENTION

Figure 1:
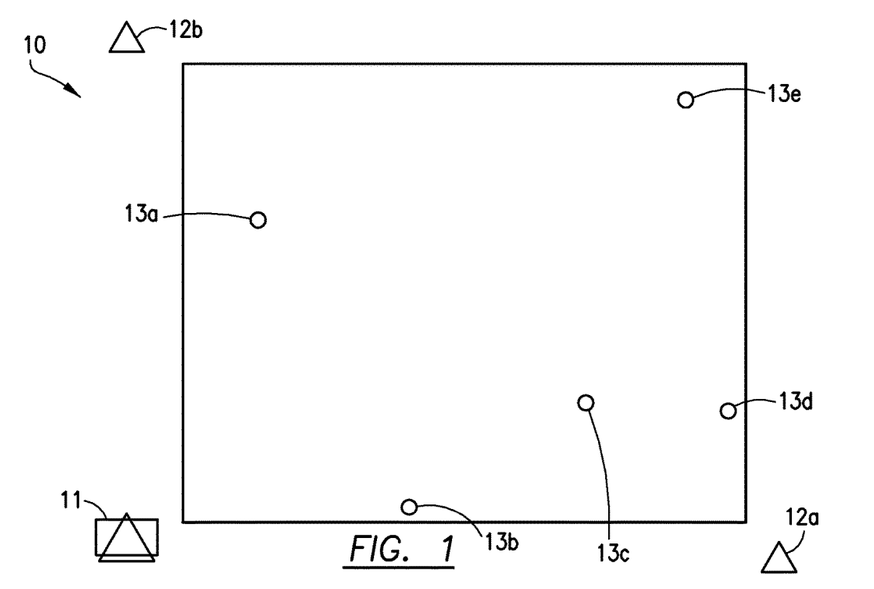
FIG. 1 is a top plan view of the output display of a single floor embodiment of the positioning tracking system built in accordance with the present invention.
Figure 2:
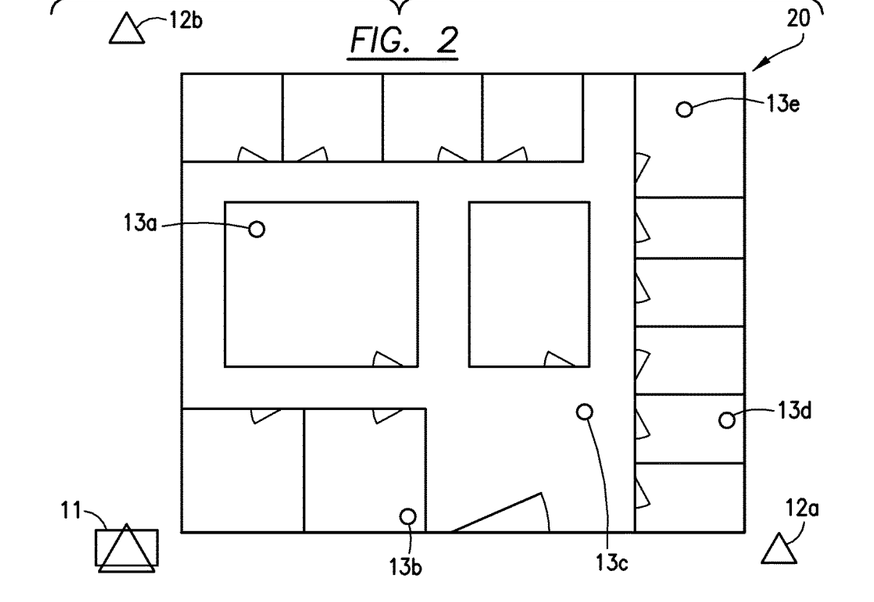
FIG. 2 is a top plan view of the output display from FIG. 1 integrated and overlaid onto a floor plan map of the area in which the system is deployed.

The preferred embodiment of this invention consists of a three separate components: 1) one or more mobile nodes, 2) at least three synchronization pulse reference node, and 3) command node all operating together as a system in a target area. Referring now to the drawings and in particular FIGS. 1 and 2, a display of a target area 10 and an integrated target area 20 where the deployed system and method for increased indoor position tracking accuracy is shown. The difference in the between the target area 10 and the integrated target area 20 is that the integrated target area 20 has a map integrated and overlaid onto its display. Such integration and overlaying allows the overall features of the area monitored to provide perspective to the position tracking.

The command node 11, which is the overall system control station and functions as the command station, provides a command means for measuring position. In the preferred embodiment, it includes a display means for displaying position through a multitude of display screens used to monitor the real-time position of the mobile nodes 13a, 13b, 13c, 13d, 13e (reference numbers collectively "13") as they move throughout the area. The command node will be typically set up at a known, fixed location, ideally where its positioning will be determined accurately via DGPS with survey-quality precision. Therefore, it is desirable for the command node to be set up outside the building, with a clear view of the overhead sky. In addition, as a command node 11 can provide the functionality as a reference node, the command node 11 can additionally serve as one of the reference nodes for a deployed positioning system built in accordance with the instant invention. As shown in FIGS. 1 and 2, the command node 11 is also a functioning reference node.

In some embodiments, the command node 11 may utilize the available data link from the mobile nodes 13 back to the command node for the inclusion of additional data which may be tracked by the mobile nodes, including biometric sensor data, 3-axis accelerometer data, and operating temperature data.

Each reference node 11[1], 12a, 12b (reference numbers collectively "12") is a discrete sync pulse transmitter which provide a reference means for transmitting. As with the command node, the reference nodes must also establish absolute timing and position information via DGPS. They will establish and coordinate accurate position relative to each other and coordinate initialization data and timing slots between themselves. As it is appreciated that in every scenario, all reference nodes may not have a clear view of the overhead sky, another way to accomplish this relative positioning is by direct laser-sighting when line of sight from command node 11 to reference nodes 12, from reference nodes 12 to reference nodes 12, or reference node 12 to a fixed surveyed corner of a building is available. Once the system is initially configured, the purpose of the reference nodes 12 is to simultaneously send out a periodic and repetitive sync pulse (or timing pulse) that each mobile node 13 will subsequently receive and use for distance measurement. In the preferred embodiment, the reference nodes 12 sync pulse transmissions are driven off the 1 PPS output from the DGPS. In deployment, at least three reference nodes 12 are needed for two dimensional positioning (i.e. x- and y-), with at least four reference nodes 12 are needed for three dimensional positioning (x-, y-, and z-).

[1] For ease of reference, the command node is also being identified as a reference node because, as previously stated, in the embodiment shown in FIGS. 1 and 2, the command node is also a dual functioning reference node.

Each mobile node 13 provides a mobile means for receiving and is a discrete body-worn or device-mounted mobile unit having parallel matched receivers configured to receive the sync pulses from the reference nodes 12 and a highly precise time-domain clock counting scheme. The mobile nodes 13 measure the exact time its receivers receive the pulses from all reference nodes 12, as referenced to the mobile node's 13 own local oscillator, with the difference between the received times being the difference in RF propagation time between the closest and furthest reference nodes 12. Consequently, the time measurement error made by a given mobile node 13 is limited to only any oscillator drift between the first received sync pulse (from the closest reference node 12) and the last received sync pulse (from the furthest reference node 12). It is appreciated that this processes ensures any resolution measurement error does not integrate (i.e. add up) over time between successive pulses.

The underlying methodology through which the location of the mobile nodes 13 can be tracked is based on the TDOA of the multiple sync pulses to the mobile nodes 13 architecture. The TDOA measurement is generated for the sync pulses from each active reference node 12 in each mobile node 13. As each reference node 12 simultaneously transmits a sync pulse at a predetermined reoccurring regular interval, and each mobile node 13 is configured to measure the exact time it receives each sync pulse. The mobile nodes 13 utilize a high speed clock circuit capable of measuring the TDOA of said sync pulses to the resolution needed for precise positioning.

Once the raw TDOA measurements are obtained by the mobile nodes 13, they can be sent to the command node for processing into an actual location. In the preferred embodiment, the mobile nodes 13 are configured to wirelessly communicate such data with the command node 11 through a WiFi or other commercial off the shelf data link system. The command node 11, utilizes the known location of each reference node 12, the TDOA measurements, and trilateration algorithms to determine the position of each mobile node 13 relative to the position of the reference nodes 12. The command node 11 also conditions this location information to be able to be displayed as graphical output on a graphical user interface (or display device). It is appreciated that while the display device is typically connected to the command node 11, one or more display devices may be utilized which are in a location distinct from the command node 11. In the preferred embodiment, it is desirable for the display device to show the mobile node position information overlaid onto a graphic image of the target area, as shown in FIG. 2. The system remains capable, however, of showing on the display device the mobile node 13 position information relative to the reference node 12 without a graphic image of the target area.

Figure 3:
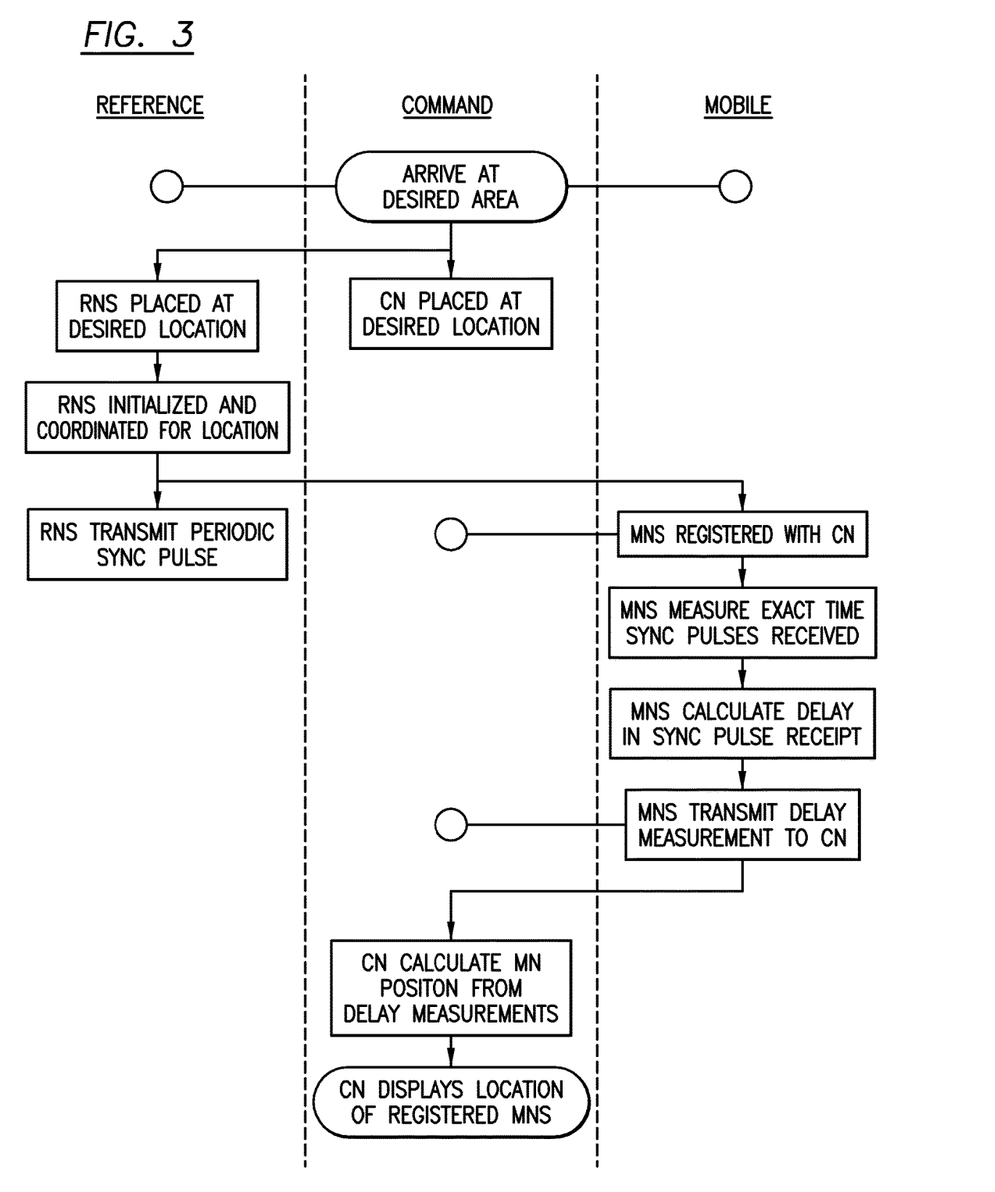
FIG. 3 shows a flow chart of the operational concept of the positioning tracking system built in accordance with the present invention.

Referring now to FIG. 3, the method in which the indoor position tracking system is deployed begins with the arrival of the components at the desired area for position tracking. Initially, the command node (CN) and reference nodes (RNS) will be placed in their desired location. The reference nodes will all be located outside in the open and around the perimeter of the target area. The reference nodes establish their exact position based upon commercial survey-quality DGPS receivers. Typical performance of current DGPS technology is between 0.4 to 0.5 meters. This resolution will be the baseline for the system performance. The reference nodes will then be configured through coordinating between themselves and the command node to initialize the network. It is understood that in the event that the command node is also a functioning reference node, it will also be required to be outside in the open with a clear view of the sky. In deployments where the command node is not also functioning as a reference node, however, this location restriction for the command node is removed.

For the reference nodes, once the system coordination and initialization is complete, they begin transmitting their periodic sync pulses simultaneously, driven off the IPPS output from the DGPS. As previously mentioned, at least three reference nodes are need for 2D positioning (i.e. x- and y-), with at least four needed for 3D positioning (i.e. x-, y-, and z-).

In addition, once the system coordination and initialization is complete, the mobile nodes desired for position tracking must be initialized. In order for the command node to track and display the positions of all the mobile nodes (MNS) in the system, each mobile node will need to initially register (i.e. login) to the command node at the beginning of the mission. This initial registration lets the command node logically establish that "MN #xxx" is now active (with a unique assigned mission serial number). This initialization is done while the mobile node is physically near to the command node (i.e. before the mobile node enters the target area) by some communication protocol such as WiFi or Bluetooth. It is appreciated that the command node could then also associate the logical MN #xxx number to an individual person, finally drawing an icon on the display device showing the position of the person by name in the area.

At this point, the indoor position tracking system is ready to track the positions of the mobile nodes in the target area. The sync pulses from the different reference nodes are received by the mobile nodes, which use matched receivers and a highly precise time-domain clock counting scheme to measure the exact time it receives each pulse from the three (or four) reference nodes (as referenced to the mobile node's own local oscillator), with the difference between the received times being the difference in RF propagation time between the closest and furthest reference node. In doing so, the time measurement error made by a given mobile node is limited to only the oscillator drift between the first received sync pulse (from the closest reference node) and the last received sync pulse (from the furthest reference node). Therefore, and most importantly, the resolution measurement error does not integrate (i.e. add up) over time between successive pulses.

The mobile nodes then send the raw measurement times to the command node via a WiFi data link. It is appreciated that this intentionally moves the burden of complex mathematical computations from the mobile nodes to the command node. Depending on the limitations of the data link chosen to send the raw position measurements back to the command node, it is expected that the positional updates for the mobile node could refresh as fast as 1 Hz on the display device.

The TDOA measurements from a given mobile node are then compared to the known location of each reference node and input into trilateration algorithms by the command node. The command node finally determines the actual mobile node position relative to the actual position of the reference node (which is known and was established/coordinated previously). The resulting absolute position is displayed graphically on a display device and may be overlaid onto a graphic image of the target area if such is available.

Operating Frequency (United States).

The U.S. FCC has recently reallocated spectrum reclaimed from the broadcast industry for public safety use in the 700 MHz band, with provisions for narrowband and wideband waveforms.[2] The wideband rules allow for 50 kHz bandwidth channels (channels 1 thru 120) between 767 and 773 MHz. Additionally up to 3 channels can be aggregated, subject to special approvals. For local (on scene) use, the transmit power is 2 W ERP (max). The system herein is initially being designed to use these frequencies by emergency services personnel.

[2] Ref: FCC Part 90.531 (b) and (c).

Channel Bandwidth.

In the proposed physical link, the 1 PPS timing boundary edge is the only information being sent. Therefore this represents just 1 bit/Hz in terms of information rate. From the Shannon-Hartley theorem:

$$C = B * \log 2(1 + S/N);$$

where: C=channel capacity, B=bandwidth, S/N=SNR.

Therefore, the theoretical channel capacity for the system:

$$C = 25k * \log 2(1+100) = 166 \text{ kbits/sec.}[3]$$

[3] For these computational purposes SNR=100, which equates to +20 dB SNR. This is seen as a minimum threshold to achieve reliable operation.

This value is obviously much greater than the bandwidth needed in the system, so the system is not capacity limited. This extra capacity, however, will be utilized to optimize the signal rising edge timing (critical for precision ranging measurements).

Range.

Exemplary link budget analysis is given on the next page as ESPM Link Budget. It shows that if the reference nodes transmit to the mobile nodes at 2 Watts on the dedicated Emergency Responder frequency of 767 MHz, there is at least 24 dB of link margin left at 3 km, even with an estimated 20 dB of signal loss associated with penetrating through building walls.

| ESPM Link Budget | | | | |
|---|---|---|---|---|
| | | Given Value | Units | Std Value | Units |
| Reference Node (RN) Paramters | | | | |
| a1 Gain of antenna | | 3 | dBi | 3.0 | dBi |
| c1 Cable Feed Loss (from PA to antenna) | | 0.5 | dB | 0.5 | dB |
| p1 Power out | | 2 | W | 33.0 | dBm |

NOTE: 90 deg directional antenna used

-continued

ESPM Link Budget

|  |  | Given Value | Units | Std Value | Units |
|---|---|---|---|---|---|
| E1 | ERP (dBm) |  |  | 35.5 | dBm |
|  | Mobile Node #1 (MN1) Link Paramters |  |  |  |  |
| a2 | Gain of antenna | 0 | dBi | 0.0 | dBi |
| c2 | Cable Feed Loss (from PA to antenna) | 0.5 | dB | 0.5 | dB |
| p2 | Power out | 500 | mW | 27.0 | dBm |
| NOTE: | cellular monopole omni antenna used |  |  |  |  |
| E2 | ERP (dBm) |  |  | 26.5 | dBm |
| r12 | Max distance between RN and MN1 antenna | 2 | miles | 3.2 | km |
| f | Frequency of transmission | 767 | MHz | 767.0 | MHz |
| h1 | Height of RN antenna | 10 | ft | 3.0 | m |
| h2 | Height of MN antenna | 4 | ft | 1.2 | m |
| lw | Signal loss thru walls of building |  |  | 20.0 | dB |
| Req | Required signal level (minimum sensitivity) of data modem |  |  | −110.0 | dBm |
| NOTES: | Frequency is per FCC 90.531c |  |  |  |  |
|  | MN is located on first floor (worst case for signal propogation) |  |  |  |  |
|  | Signal attenuation due to building material is estimated, to be verified during testing |  |  |  |  |
|  | Sensitivity of receiving modem is estimated, will depend on specific waveform/modulation |  |  |  |  |
| FS12 | Free space loss between RN & MN = 32.4 + 20log(r) + 20log(f) |  |  | 100.2 | dB |
| M12 | Margin in Link (RN → MN) |  |  | 24.8 | dB |

Position Resolution.

The most critical component of the system is the measurement resolution of the pulse timing by the mobile nodes. This measurement must be fine enough to achieve the x- and y-performance accuracy criteria established in the system requirements section. Assuming operation on the U.S. frequency=767 MHz, then: each wave period=1/f=1.3 nS. Also, $\lambda$=c/f=39 cm=15.4 inches. Therefore, to measure this waveform within a wavelength, the system uses a clock counter running at a minimum of 1 GHz. In that case, each clock cycle (1 nS) represents about 39/1.3=30 cm=11.8 inches of resolution. (This resolution would get better for counter clock speeds greater than 1 GHz, but may incur unneeded additional cost).

Multipath.

Multipath is essentially a delay spread from the original pulse due to reflections off surrounding structures, resulting in multiple copies (in time) of the original signal being received at the receiver. In the system, the timing sync pulse will be sent from each reference node to all mobile nodes in the target area once per second, driven off the DGPS IPPS output. By definition, multipath interference cannot occur (i.e. arrive at the receiver) before the original signal is received. Only the initial leading edge time of the first-received pulse is used in the TDOA calculations. Moreover, since there is no real data to be transferred through (i.e. coded into) this sync pulse, the mobile node only has to detect that initial transitional leading edge boundary and ignores any waveform collisions beyond this boundary for each pulse. As a result, the effect of multipath is therefore minimized. The exact waveform for this pulse is chosen to minimize the ambiguity in time of when the pulse is first received for the straight line path, while still keeping within the channel bandwidth constraints.

Display Mapping.

In order to plot the position of each mobile node on a map of the target area, the command node will have to be able to download a map of the building and tie reference node positions to a fixed point on the map. These maps cannot be assumed to be in a digital vector format. In fact, many older buildings may still have legacy hand-drawn blueprints. For the system to accurately display mobile node position icons on such a map, the reference nodes will have to correlate their actual position to some explicit point on the map such as a particular corner of the building. For example, the reference nodes could implement this via laser-sighting to a given corner of the building and measure that distance. They would then associate that with their internal DGPS position in order to establish absolute positioning. The overall system and position tracking functions would then be accurate relative to the accuracy of the building survey.

Figure 4:
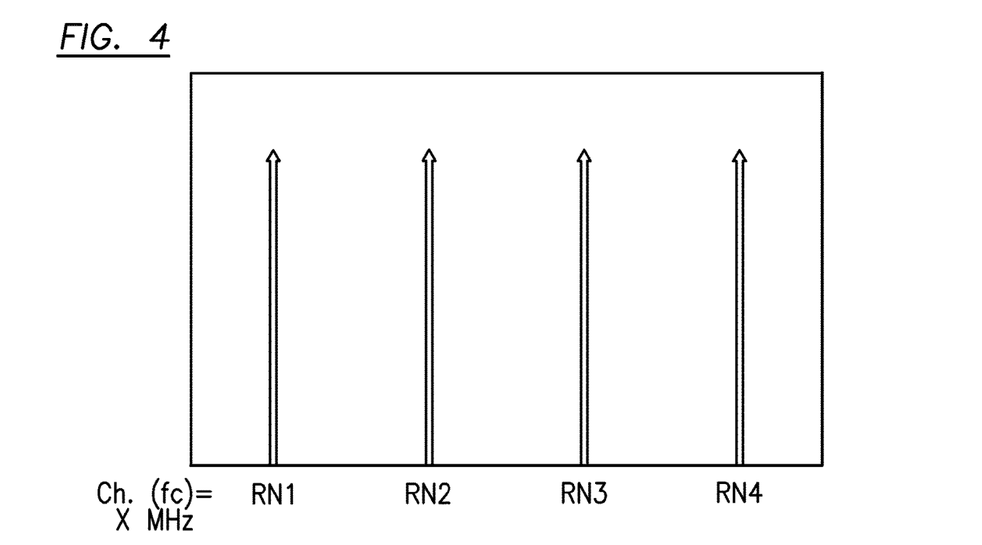
FIG. 4 show a graph of the continuous wave tone transmitted on the four sub-channels of the operational 50 kHz channel.

Referring now to FIG. 4, the reference node to mobile node waveform used to implement the timing pulse is conceptually the simplest to implement. The given 50 kHz channel is subdivided into four sub-channels, and each reference node (RN1 thru RN4) would transmit a continuous wave tone in parallel on one of the sub-channels. As shown in FIG. 4, where Ch. (fc)=X MHz, RN1=X+6.25 MHz, RN2=X+18.75 MHz, RN3=X+31.25 MHz, and RN4=X+43.75 MHz.

Figure 5:
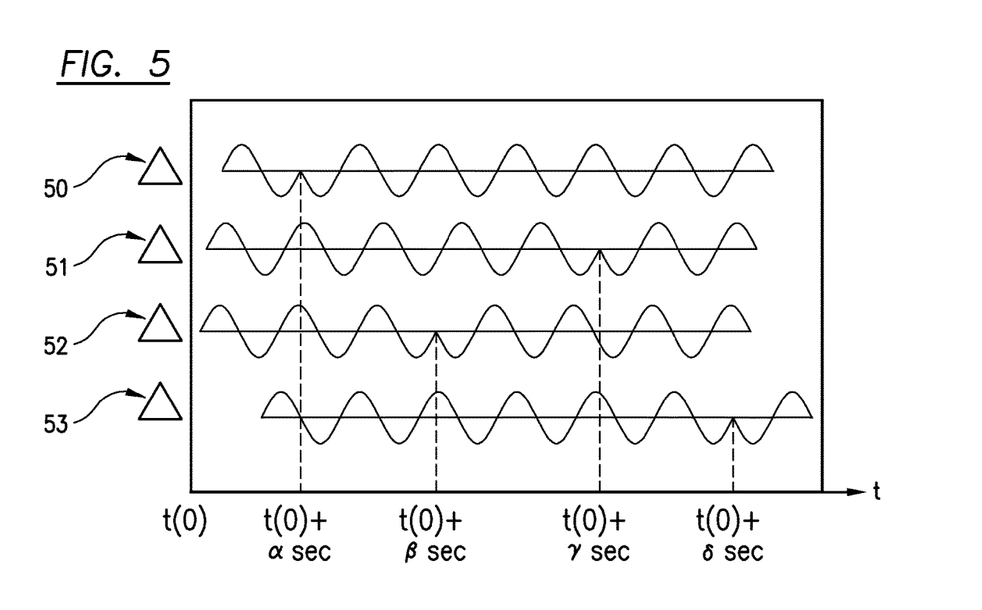
FIG. 5 shows a graph of the transmission waveform phase flip for each operating reference node built in accordance with the present invention.

Referring now to FIG. 5, each reference node then "flips its phase" as the predetermined transition boundary, tied to its internal DGPS timing reference as previously mentioned. This concept is graphically shown in FIG. 5, where t(0) is the start timing boundary, t(0)+$\alpha$ is the received time at the mobile node for RN1 50, t(0)+$\beta$ is the received time at the mobile node for RN2 51, t(0)+$\gamma$ is the received time at the mobile node for RN3 52, and t(0)+$\delta$ is the received time at the mobile node for RN4 54.

The advantage of this waveform is that it is easy for the mobile node to detect the carriers (four parallel matched filters) by locking onto the four sub-channel frequencies. The waveform architecture above would also result in a simplified (an inexpensive) receiver architecture, where each mobile node would simply replicate the circuitry needed to implement four parallel receivers.[4]

[4] Care is taken to ensure "identical matched components" are chosen for the four parallel receivers. This is needed to ensure that signal processing times are consistent from one channel to the next.

It is recognized that the disadvantages include that the spectral components of the transmitted pulse at the phase transition boundaries may spill into adjacent channels, and the "detection time" for the mobile node to detect a phase transition may not be stable enough from one period to the next, introducing a "measurement jitter" that will degrade measurement resolution. Additionally, the waveform relies on the channel being relatively quiet and clear of in-band interferers.[5]

[5] This system assumes operation on a FCC channel that is authorized for emergency usage only. It is therefore desirable to be the only authorized transmitter on the given channel (assuming appropriate coordination among different emergency agencies). It is recognized, however, that there may be noise or unintentional transmissions in-band which may require a more robust waveform in other product embodiments.

Data Smoothing.

The measured receive times of each reference node's pulse as measured by the mobile node will form the basis for the position calculation. The actual position of the mobile node[6] will be determined by trilateration of the TDOA measurements done by the command node. It is expected that that some approximation or regression technique such as Least Squares Estimation will be utilized to determine the exact most likely position from the timing measurements. This position will ultimately be displayed on a map/floor plan of the building and real-time updating of the screen is expected at the 1 Hz interval rate. Finally, these position vectors will most likely needed some amount of logical boundary checking and subsequent "data soothing" to ensure that the infrequent bad data point is filtered and not displayed on the screen.

[6] It is inherent in this system that the exact positions of the MNs are always referenced to the RNs. Thus the actual real position of the MNs will always be offset by any error in the absolute/actual position of the RNs.

In an alternate embodiment, the mobile nodes will include a solid state thermocouple or temperature sensing circuit, used to accurately monitor PCB core operating temperature. The output of this temperature circuit is used for two purposes: 1) as input to compensation feedback circuit, used to keep oscillator stability within required tolerances as operating temperatures vary, and 2) as information available to the processor in the mobile node, for status broadcast back to the command node.

In another alternate embodiment, each mobile node does its own necessary calculations to determine its exact relative position to the reference nodes. Additionally, this mobile node version may optionally have a graphics display capability embedded, in order to display its current position on a pre-downloaded floor plan. This mobile node version shall come with a 3-axis accelerometer and solid state compass in order to separately track small incremental movements. Additionally, this version shall also have the capability to establish a local Mesh Network with other mobile nodes in the area, and display their positions relative to its own.

The instant invention has been shown and described herein in what is considered to be the most practical and preferred embodiments. It is recognized, however, that variations and departures may be made therefrom within the scope of the inventions and that obvious modifications will occur to a person of ordinary skill in the art.

What is claimed is:

1. A position tracking system for tracking at least one mobile module suitable for a defined GPS-denied target area, the position tracking system including:
    at least three reference modules in a GPS permitted area surrounding said defined GPS-denied target area, where said at least three reference modules are configured to periodically broadcast reoccurring synchronization pulses simultaneously driven off the 1 Pulse-Per-Second out put from differential GPS;
    said at least one mobile module having a local oscillator using a clock counter running at least at 1 GHz for measuring each pulse wave form within up to a wavelength and at least one receiver configured to receive said synchronization pulses and record a time of receipt of each of the reoccurring said synchronization pulses from each of said at least three reference modules as referenced by said at least one mobile module's own local oscillator, wherein said at least one mobile module records time of arrival data from the each of the reoccurring said synchronization pulses and said time of arrival data necessary to calculate a specific physical location of said at least one mobile module relative to said at least three reference modules and measure said time of arrival data to a resolution needed for precision positioning; and
    said at least one mobile module having at least one receiver which calculates said time of arrival data using only a differential time reference measurement between the receipt of the each of the reoccurring said synchronization pulses as referenced by said at least one mobile module's own local oscillator, thereby eliminating the need for coherent time synchronization between said at least three reference modules and said at least one receiver, wherein the broadcast of the reoccurring said synchronization pulses is driven off the 1 Pulse-Per-Second output from the Differential GPS to lock a starting time of the each of the reoccurring said synchronization pulses;
    wherein the each of said at least three reference modules broadcast the each of the reoccurring said synchronization pulses simultaneously on a discrete sub-channel of a frequency channel utilization.

2. The position tracking system as in claim 1, wherein a graphical representation is overlaid onto map showing features of the target area.

3. The position tracking system as in claim 1, wherein said at least one mobile module has at least three receivers.

4. The position tracking system as in claim 1, wherein three reference modules are utilized.

5. The position tracking system as in claim 1, wherein four reference modules are utilized.

6. The position tracking system as in claim 1, wherein the each of said at least three reference modules establishes its respective absolute geographic position using Differential GPS receivers.

7. The position tracking system as in claim 1, wherein said at least one mobile module has four receivers.

8. The position tracking system as in claim 1, wherein said synchronization pulses pulse data comprises a measurement of said Time of Arrival of said synchronization pulses from said at least three reference modules.

9. The position tracking system as in claim 1, including:
    a command node configured to electronically communicate with said at least three reference modules and said at least one mobile module and to coordinate operation of said at least three reference modules, wherein coordinating the operation of said at least three reference modules and said at least one mobile module determines the specific physical location of said at least one mobile module; and
    a display device having a graphical representation of the specific physical location of said at least one mobile module relative to said at least three reference modules.

10. A position tracking method for locating at least one mobile module within a GPS: denied target area suitable for a defined GPS-denied target area, the position tracking method comprising the steps of:
    providing inside said defined GPS-denied target area the at least one mobile module having a synchronization pulse receiver and a local oscillator;

providing in a GPS permitted area at least first, second, and third reference modules, said at least first, second, and third reference modules configured to periodically broadcast simultaneously first, second, and third reoccurring synchronization pulses respectively to enhance an accuracy of location and to reset cumulative error to zero at a start of each periodical broadcast;

receiving said at least first, second, and third reference modules reoccurring synchronization pulses in the at least one mobile module;

recording exact time of receipt of each of said first, second, and third reoccurring synchronization pulses from each of said at least first, second, and third reference module; and the at least one mobile module's own local oscillator using a clock counter running at least at 1 GHz measuring time of arrive data of the each of said first, second, and third reoccurring synchronization pulses from said at least first, second, and third reference modules to measure the time of arrival data to a resolution necessary for measuring the each of said first, second, and third reoccurring synchronization pulses within up to a wave length for precision positioning;

providing known accuracy specific location of each of said at least first, second, and third reference module;

providing a display;

configuring said at least first, second, and third reference modules, wherein the step of configuring said at least first, second, and third reference modules comprises placing said at least first, second, and third reference modules so that the each of said at least first, second and third reference module is located around a perimeter of the target area in said GPS permitted area and establishing their respective geographical positions based upon differential GPS receivers or via fixed site survey data;

broadcasting by the each of said at least first, second, and third reference modules, said first, second, and third reoccurring synchronization pulses simultaneously; and measuring by the at least one mobile module and its local oscillator time difference between said first, second, and third reoccurring synchronization pulses, and using the time difference to calculate location of the at least one mobile module;

wherein the each of said first, second, and third recurring synchronization pulses is driven off the 1 Pulse-Per-Second output from the Differential GPS to lock a starting time of each of said first, second, and third simultaneous synchronization pulses; and wherein the each of said at least first, second, and third reference module broadcast said first, second, and third reoccurring synchronization pulse on a discrete sub-channel of the frequency channel utilized; and the at least one mobile module has at least three receivers for receiving said first, second, and third reoccurring synchronization pulses from said at least first, second, third reference modules.

11. The position tracking method as in claim 10, wherein:
four reference modules are utilized; and
the at least one mobile module has four receivers.

* * * * *